United States Patent [19]

Itoigawa et al.

[11] Patent Number: 5,759,332
[45] Date of Patent: Jun. 2, 1998

[54] PROCESS OF REPRODUCING OPTICAL DISCS AND OPTICAL DISCS PRODUCED BY THE SAME

[75] Inventors: Masahide Itoigawa; Mitsuhiko Sasano; Shinichi Hanzawa; Masaaki Motokawa; Yoshikazu Hirai; Haruhisa Maruyama, all of Yamanashi, Japan

[73] Assignees: Pioneer Electronic Corporation, Tokyo; Pioneer Video Corporation, Nakakoma-gun, both of Japan

[21] Appl. No.: 651,841

[22] Filed: May 21, 1996

[30] Foreign Application Priority Data

| May 22, 1995 | [JP] | Japan | 7-146773 |
| Jun. 5, 1995 | [JP] | Japan | 7-161514 |
| Jun. 16, 1995 | [JP] | Japan | 7-174092 |
| Jun. 16, 1995 | [JP] | Japan | 7-174093 |

[51] Int. Cl.[6] .................................... G11B 11/00
[52] U.S. Cl. .............. 156/273.5; 156/74; 156/275.1; 156/275.3; 156/275.7; 369/286
[58] Field of Search ................... 156/272.2, 273.3, 156/273.5, 275.1, 275.3, 275.5, 275.7, 290, 74; 369/286; 428/64.4, 65.2

[56] References Cited

U.S. PATENT DOCUMENTS

| 4,717,605 | 1/1988 | Urban et al. | 156/275.7 |
| 5,077,120 | 12/1991 | Kato et al. | 369/286 |
| 5,146,438 | 9/1992 | Harper | 369/286 |

*Primary Examiner*—Michael W. Ball
*Assistant Examiner*—Michael A. Tolin
*Attorney, Agent, or Firm*—Perman & Green, LLP

[57] ABSTRACT

A laminate optical disc which has excellent heat resistance and also has sufficient bond strength. Radiation-curing adhesive layers are formed on a pair of transparent base plates excluding the outermost circumferential portions, respectively, and an ultraviolet-curing resin is applied to the outermost circumferential portion. Then, the pair of transparent base plates are bonded together by the radiation-curing adhesive layers, and also ultraviolet light is irradiated to the ultraviolet-curing resin to fix the base plates firmly to each other along the outermost circumferential portions. In a process for producing a laminate optical disc, radiation-curing adhesive layers are formed respectively on a pair of transparent base plates, and then irradiated with a radiation excluding at least the outermost circumferential portion to be tackified. After the thus treated base plates are bonded together by the radiation-curing adhesive layers, the outermost circumferential portions of these layers are irradiated until they lose tackiness.

4 Claims, 7 Drawing Sheets

RECORDING AREA | INNER NON-RECORDED AREA

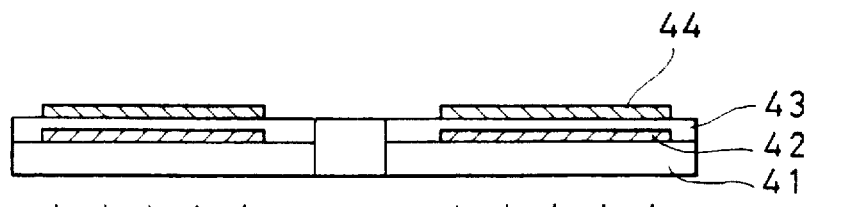
FIG. 4A
FIG. 4B
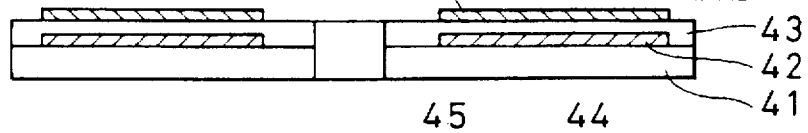
FIG. 4C
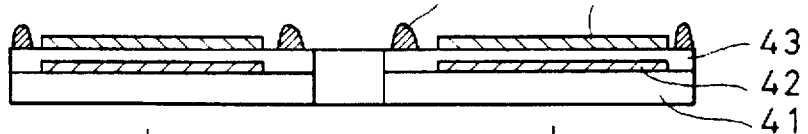
FIG. 4D
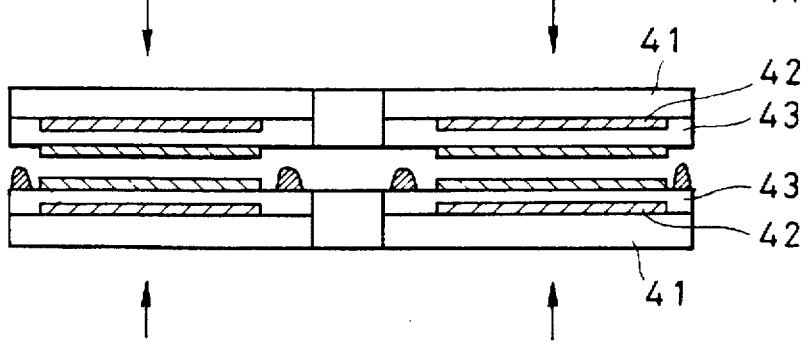
FIG. 4E
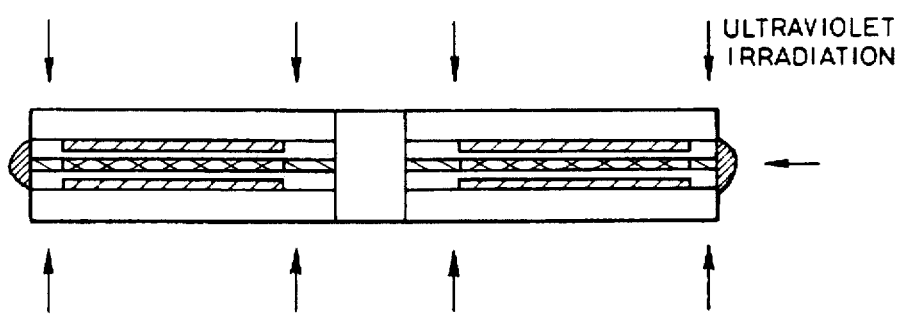

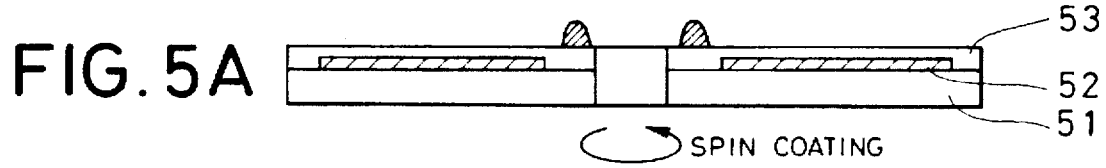
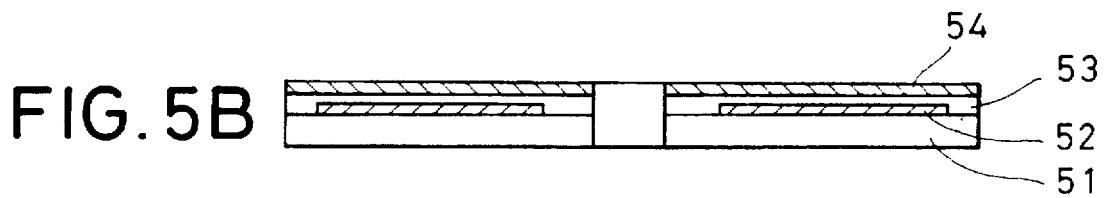
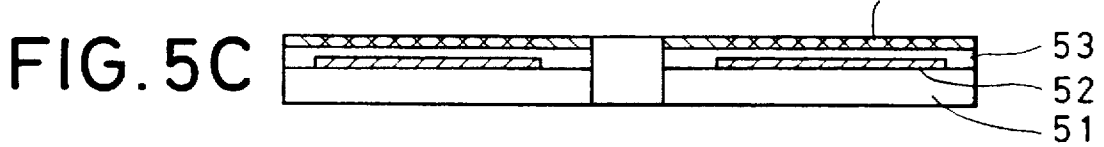
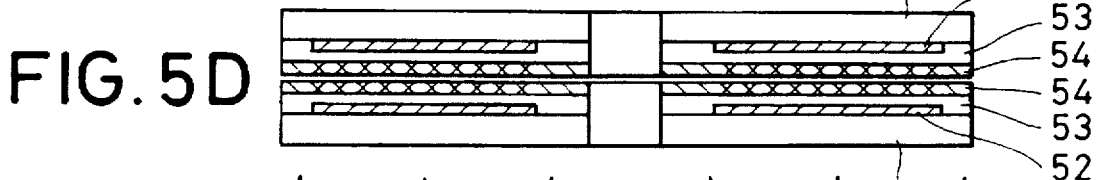
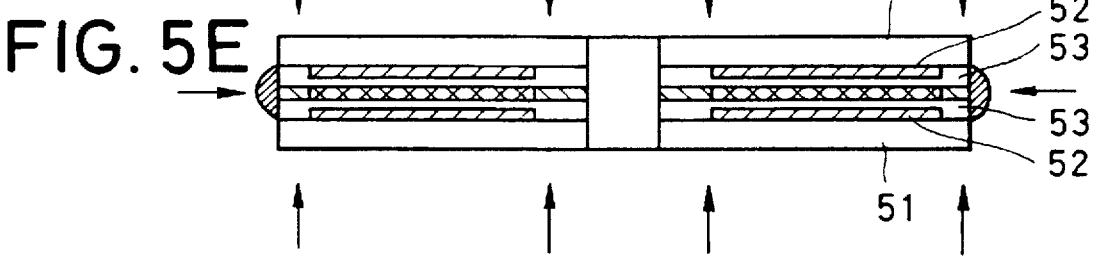

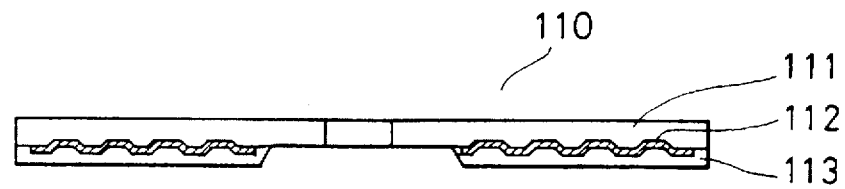
FIG. 8A
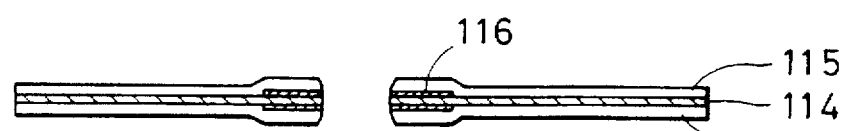
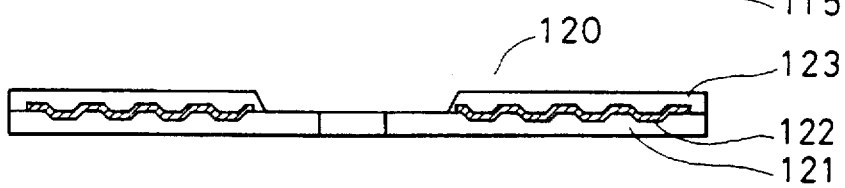
FIG. 8B
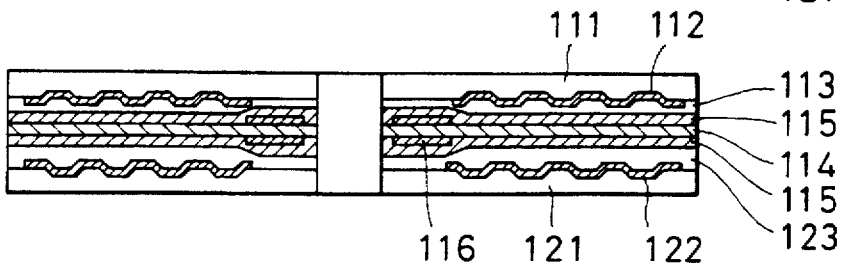
FIG. 9
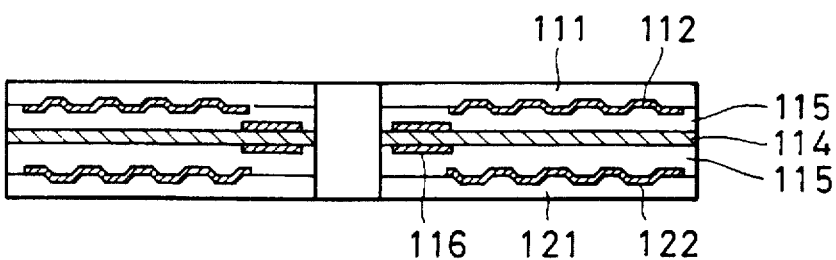

5,759,332

PROCESS OF REPRODUCING OPTICAL DISCS AND OPTICAL DISCS PRODUCED BY THE SAME

BACKGROUND OF THE INVENTION

1. Field of the Invention

The present invention relates to an optical disc formed by bonding a pair of discs together and also to a process for producing the same.

Further, the present invention relates to a process for producing an optical disc, particularly to a process of coating optical disc base plates (replicas) with a coating material.

The present invention also relates to improvement in display in such laminate optical discs.

2. Description of Background Information

There have been known a double-side recorded disc, as optical discs including video discs, as shown in FIG. 1, in which a pair of discs, each consisting of a base plate 11 made of a light-transmitting resin, having pits or grooves carrying information formed on one surface concentrically or spirally, and a reflecting film 12 and a protective film 13 formed on the base plate 11 in this order, are bonded together by an adhesive layer 14 such that the protective films 13 may oppose each other. The double-side recorded disc is designed to be clamped aiming at a center hole defined at the center of the disc and rotated under irradiation of a reading beam against the recorded area of each disc surface so as to optically read the information stored in it.

In such laminate optical disc, a hot-melt adhesive is generally employed as the adhesive layer.

However, since the hot-melt adhesive is thermoplastic, it has poor heat resistance to readily cause deformation or de-lamination in the disc, disadvantageously. It may be expected to employ a radiation-curing adhesive having excellent heat resistance for bonding the discs. However, while the radiation-curing adhesive cures to develop tackiness upon irradiation of a radiation such as ultraviolet light and electron beams, the molecule of the adhesive is converted to assume a triple bond structure by the irradiation to lose fluidity, so that sufficient bond area cannot be obtained if the surface on which the adhesive is applied is rough before irradiation is carried out. Accordingly, bond strength becomes insufficient, and de-lamination is likely to occur at the edge of the laminate disc, disadvantageously.

Meanwhile, spin coating method has been conventionally employed for forming a protective film on the base plate. According to this method, a coating material (liquid form) 22 is dropped in an annular form around the center of a disc base plate 21, and then the base plate 21 is rotated at a high speed to spread the coating material 22 by the centrifugal force over the surface of the base plate 21.

Base plates of optical discs are generally marked with the shape of a stamper holder provided for holding a stamper, carved with information patterns, along the inner circumferences thereof, when the base plates are molded in a die. That is, an annular recess 25 is formed between a non-recorded area 23 and a recorded area 24 on the base plate 21, as shown in FIG. 2A. Accordingly, the coating material 22 is dropped, avoiding the annular recess 25 along the outer circumference of the recess 25 or the inner circumference of the recorded area 24, and the thus treated base plate 21 is rotated at a high speed to spread the coating material 22 by the centrifugal force over the surface of the base plate 21. Thus, the coating material 22 can be applied uniformly on the surface of the recorded area 24 of the base plate 21, as shown in FIG. 2B.

However, according to the above-described method, the coating material 22, as a matter of course, cannot be applied on the surface of the non-recorded area locating inner than the annular recess 25. Then, if the coating material 22 is dropped on the inner non-recorded area 23 of the base plate 21, as shown in FIG. 2C, the coating material 22 can be spread over the entire surface of the base plate 21 including the inner non-recorded area 23, as shown in FIG. 2D. However, the coating material 22 undulates when it covers the annular recess 25 to form a coating film having a nonuniform thickness, and besides the air present in the annular recess 25 is included in the coating layer in the form of air cells. Such air cells and uneven thickness of the coating film cannot be eliminated even after the coating film is cured by ultraviolet irradiation to cause problems including deterioration of the quality of the protective film formed on the base plate.

A conventional laminate optical disc, for example, a video disc, is of a constitution in which a pair of single discs each consisting of a light-transmitting base plate 31, with a reflective film 32 and a protective film 33 being formed on the base plate 31 in this order, are bonded together via an adhesive layer 34. Further, a paper label 35 printed with information on the recorded matters is applied to each inner non-recorded area of the light-transmitting base plate 31.

Usually, the light-transmitting base plate 31 is made of an acrylic or polycarbonate resin; the reflective film 32 is formed using aluminum or an aluminum alloy; the protective film 33 is formed of a hot-melt resin or a ultraviolet-curing resin; and the adhesive layer 34 is formed of a hot-melt adhesive.

OBJECT AND SUMMARY OF THE INVENTION

The present invention is accomplished under such circumstances, and it is an object of the invention to provide an optical disc which undergoes no de-lamination at the bonding edges and also to provide a process for producing the same.

An optical disc according to one aspect of the present invention consists of a pair of opposing transparent base plates each having on the major surface a recorded area with the outermost and innermost circumferential portions remaining as non-recorded areas; an irradiation-curing adhesive interposed between the opposing recorded areas of the pair of transparent base plates to bond them together; and an ultraviolet-curing resin layer formed between the outermost circumferential portions of the pair of transparent base plates to fix them firmly to each other at that portions.

According to a second aspect of the present invention, the process for producing an optical disc comprises a step of preparing a pair of transparent base plates each having a recorded area formed on the major surface excluding the outermost and innermost circumferential portions; a step of forming a radiation-curing adhesive layer on the recorded area of each transparent base plate, followed by irradiation of a radiation on the radiation-curing adhesive layer to impart tackiness thereto; a step of dropping an ultraviolet-curing resin annularly onto one of the transparent base plates annularly along the outermost circumferential portion; a step of bonding the thus treated pair of transparent base plates together by the radiation-curing adhesive layers; and a step of irradiating ultraviolet light onto the ultraviolet-curing resin to cure it and to fix the pair of transparent base plates firmly to each other along the outermost circumferential portions.

The radiation-curing adhesive layers present between the opposing recorded areas of the pair of transparent base plates retain tackiness, while the ultraviolet-curing resin layer present between the outermost circumferential portions is cured to adhere the pair of base plates to each other, so that the stress to be generated by deformation of disc can be absorbed by the adhesive layers, and the discs are fixed firmly to each other by the resin layer at the bonding edges.

According to another aspect of the present invention, the process for producing an optical disc comprises a step of preparing a pair of transparent base plates each having a recorded area containing pits or grooves formed on the major surface excluding the outermost and innermost circumferential portions; a step of forming a radiation-curing adhesive layer on the major surface of each transparent base plate; a step of irradiating a first predetermined dose of radiation to impart tackiness to the radiation-curing adhesive layer at least at the portion present on the recorded area; a step of bonding the thus treated pair of transparent base plates together by the radiation-curing adhesive layers; and a step of irradiating a second predetermined dose of radiation, which is greater than the first predetermined dose, onto the radiation-curing adhesive layer at least at the outermost circumferential portions to extinguish tackiness.

Since the portion of the radiation-curing adhesive layers present between the opposing recorded areas of the pair of transparent base plates retain tackiness, while the portion of the radiation-curing adhesive layers present along the outermost circumferential portion is cured to lose tackiness, the adhesive layers not only absorb stress to be generated when the optical disc is deformed but also fixes the discs firmly to each other at the bonding edges.

It is another objective of the present invention to provide a spin coating process for forming a protective film on a reflecting layer in a prior art disc base plate having an annular recess, wherein the presence of such annular recess does not give an adverse effect such that air cells are included in the coating material, and a coating film can be formed uniformly over the entire surface of the base plate.

According to the coating process of the present invention, the coating material is dropped annularly on the base plate along the inner circumference of a first zone which is present at a position inner than the annular recess and also along the inner circumference of a second zone which is present at a position outer than the annular recess; and the base plate is rotated to spread the coating material substantially uniformly over the entire surface of the base plate.

As described above, in the coating process for coating a base plate on which an annular recess is formed at a position inner than an information recorded area with a coating material according to the present invention, the coating material is dropped annularly on the base plate along the inner circumference of the first zone which is present at a position inner than the annular recess and also along the inner circumference of the second zone which is present at a position outer than the annular recess, so that a coating film can be formed substantially uniformly over the entire surface of the base plate without being affected by the presence of the annular recess.

Meanwhile, when the above-described optical disc shown in FIG. 3 is loaded onto a player, the label surfaces serve as clamping surfaces, so that the paper labels are likely to be scratched to make letters and the like carried thereon illegible. The present invention has been accomplished in view of such circumstances, and it is a further objective of the present invention to provide a reliable optical disc having quality display portions.

In order to overcome the problem described above, the present invention provides a pair of light-transmitting disc-shaped base plates each having a non-recorded area along the innermost circumferential portion which are opposed to each other and bonded together by an adhesive with a sheet-like member being interposed between them; wherein the sheet-like member has display portions formed at the sites where they are opposed to the non-recorded areas of the base plates respectively.

According to the optical disc of the present invention, since the display portions are sandwiched between the pair of disc-shaped base plates, they are prevented from being scratched, and application of the display portions and lamination of the base plates can be performed simultaneously. In addition, the sheet-like member, if suitably selected, may serve to improve rigidity of the optical disc.

BRIEF DESCRIPTION OF THE DRAWINGS

FIGS. 4A to 4E show a flow chart illustrating a process of producing an optical disc according to a first embodiment of the present invention;

FIGS. 5A to 5E show a flow chart illustrating a process of producing an optical disc according to a second embodiment of the present invention;

FIGS. 8A and 8B are cross-sectional views of an optical disc according to a third embodiment of the present invention; and FIG. 9 is a cross-sectional view of an optical disc according to a fourth embodiment of the present invention.

DETAILED DESCRIPTION OF THE PREFERRED EMBODIMENTS

Figure 1:
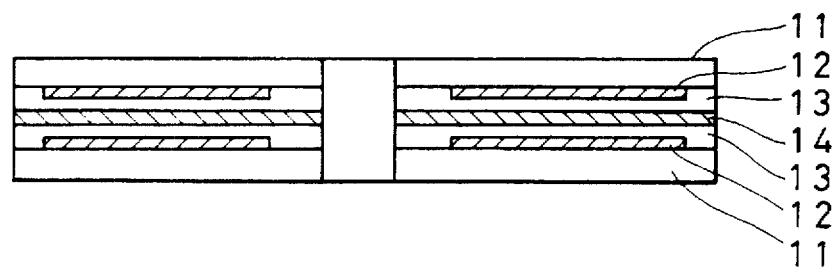
FIG. 1 is a schematic vertical cross-sectional view showing constitution of a prior art optical disc.
Figure 2A:
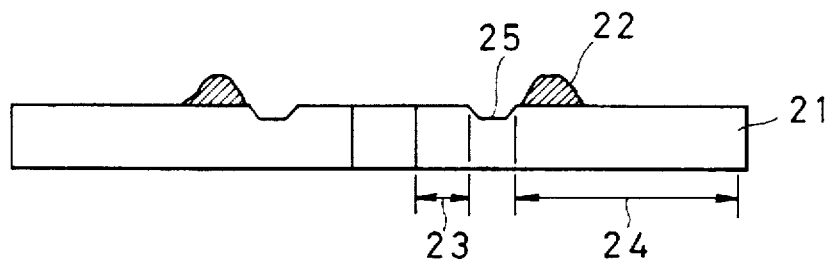
FIGS. 2A to 2D are views illustrating processes of applying a coating material onto a base plate according to prior art examples.
Figure 2B:
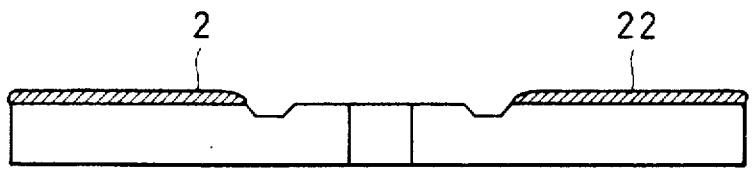
Figure 2C:
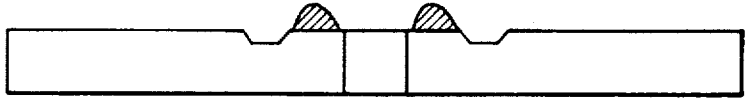
Figure 2D:
Figure 3:
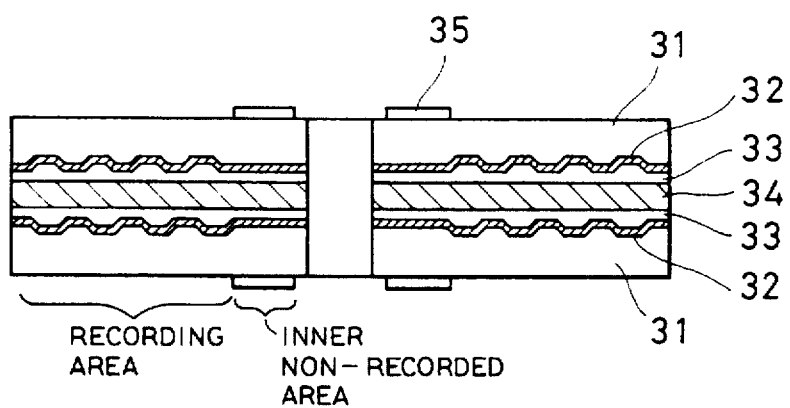
FIG. 3 is a vertical cross-sectional view of a prior art optical disc.

An optical disc according to a first embodiment of the present invention will be described specifically referring to FIGS. 4A to 4E. The optical disc of the first embodiment consists of a pair of discs which are laminated to each other. First, a pair of transparent base plates 41 are prepared by means of injection molding and the like. The thus obtained base plates 41 each have, on the major surface excluding the innermost and outermost circumferential portions, a recorded area where pits or grooves consisting of fine recesses and protrusions representative of information are formed. Next, a reflecting film 42 such as of aluminum is formed on the recorded area excluding the outermost and innermost circumferential portions, and then a protective film 43 such as of a ultraviolet-curing resin is formed to cover the innermost and outermost circumferential portions as well as the recorded area of each transparent base plate to provide a pair of discs. Incidentally, the transparent base plates 41 are disc-shaped synthetic resin base plates, such as of polymethyl methacrylate (PMMA) and polycarbonate (PC), or glass plates, having a thickness of 0.2 to 0.8 mm, for example 0.6 mm.

Subsequently, as shown in FIG. 4A, a radiation-curing adhesive layer 44 having a thickness of several tens of microns is formed by means of screen printing on the protective layer 43 excluding the innermost and outermost circumferential portions. The radiation-curing adhesive contains as a major component an acrylic oligomer and as essential components a rubbery polymer and a tackifier but contains no volatile solvent, and it also has a viscosity of 50,000 cps or less at room temperature (20° C., uncured), for example 21,500 cps. The radiation-curing adhesive suitably includes, for example, CT-110K10 manufactured by Cemedine Co., Ltd. Next, as shown in FIG. 4B, a predetermined dose of radiation is irradiated on the radiation-curing adhesive layer 44 assuming a liquid state, and thus the adhesive layer 44 is cured to exhibit tackiness.

Then, as shown in FIG. 4C, a liquid ultraviolet-curing resin 45 is dropped on the protective layer 43, in one disc, annularly along the innermost and outermost circumferential portions where no radiation-curing adhesive layer 44 is formed. The ultraviolet-curing resin 45 contains as the major component a polyfunctional acrylate monomer and has a viscosity of 530 cps at room temperature (20° C., uncured), and suitably includes, for example, Daicure Clear SD-301 manufactured by Dainippon Ink & Chemicals, Co., Ltd.

Next, after the thus treated disc is opposed to another disc as shown in FIG. 4D, and are pressed to be bonded together by the radiation-curing adhesive layers 44, the ultraviolet-curing resin covering the innermost and outermost circumferential portions and a part of the resin squeezed out of the outermost peripheral portions to cover the bonding edges are irradiated with ultraviolet light and cured, as shown in FIG. 4E, and thus the pair of discs are firmly bonded together at the innermost and outermost circumferential portions.

While a read-only laminate disc is described in the above embodiment, this embodiment can be applied to writable (WORM or erasable) laminate discs in which recording layers of a cyanine series organic pigment, a magneto-optical material or a phase-transfer material are formed instead of the recorded areas.

Further, one of the discs in the laminate optical disc may be set aside as the read-only type and the other as the writable type. Bondage to be achieved by the ultraviolet-curing resin may be at the outermost circumferential portion and the bonding edges only.

As described above, according to the present invention, a pair of discs are bonded together by the radiation-curing adhesive layer excluding at least the outermost circumferential portions, and they are also fixed firmly to each other by the ultraviolet-curing resin at the outermost circumferential portions. Thus, stress to be generated by deformation of the optical disc can be absorbed by the adhesive layers, and the discs are prevented by the resin layer from delaminating at the bonding circumferential edges.

An optical disc according to a second embodiment of the present invention will be described referring to FIGS. 5A to 5E. The optical disc of the second embodiment also consists of a pair of discs laminated to each other like in the first embodiment. First, a pair of transparent base plates 51 are prepared by means of injection molding and the like. The thus obtained base plates 41 each have, on the major surface excluding the innermost and outermost circumferential portions, a recorded area where pits or grooves consisting of fine recesses and protrusions representative of information are formed. Next, a reflecting film 52 such as of aluminum is formed on the recorded area excluding the outermost and innermost circumferential portions, and then a protective film 53 such as of an ultraviolet-curing resin is formed to cover the innermost and outermost circumferential portions as well as the recorded area of each transparent base plate 51. Incidentally, the transparent base plates 51 are disc-shaped synthetic resin plates, such as of polymethyl methacrylate (PMMA) and polycarbonate (PC), or glass plates, having a thickness of 0.2 to 0.8 mm, for example 0.6 mm.

Subsequently, as shown in FIG. 5A, a radiation-curing adhesive is dropped on the protective film 53 formed on each base plate along the innermost circumferential portion while the disc is rotated, for example, at 30 to 60 rpm or is allowed to assume a static state. The radiation-curing adhesive contains as a major component an acrylic oligomer and as essential components a rubbery polymer and a tackifier but contains no volatile solvent, and it also has a viscosity of 100 to 2,000 cps or less at room temperature (20° C., uncured). The adhesive suitably includes, for example, F-105 manufactured by Cemedine Co., Ltd. Next, as shown in FIG. 5B, the thus treated discs are rotated at a high speed, for example, at 2,000 to 4,000 rpm for several seconds to form on the protective films radiation-curing adhesive layers 54 having a uniform thickness of about several tens of micron meters, respectively.

The radiation-curing adhesive layer 54 thus formed by means of spin coating has a smooth surface compared with that formed by means of screen printing, thus providing sufficient bonding area and improving bond strength.

Next, as shown in FIG. 5C, a first predetermined dose of ultraviolet light is irradiated to allow the radiation-curing adhesive layer 54 formed on the reflecting film 52 to be cured and tackified, while the innermost and outermost circumferential portions of each transparent base plate 51 where no reflecting film 52 is formed are covered with masks 55 made of quartz glass or heat ray cut filters. Thus, the innermost and outermost portions of the adhesive layer 54 which were prevented by the masks 55 from being exposed to the ultraviolet irradiation still remain uncured.

Then, after the radiation-curing adhesive layers 54 of the thus formed pair of discs are opposed to each other as shown in FIG. 5D, and are pressed to be bonded together, the uncured portions of the radiation-curing adhesive covering the innermost and outermost circumferential portions and a part of the adhesive squeezed out of the outermost peripheral portions to cover the bonding edges are irradiated with a second predetermined dose of ultraviolet light which is sufficiently greater than the first predetermined dose for imparting tackiness. Tackiness of the adhesive is lost by the second irradiation. In other words, the ultraviolet light is irradiated until tackiness of the adhesive disappears. Thus, the radiation-curing adhesive layer 54 is cured, and bond strength at the innermost and outermost circumferential portions and at the bonding edges can be improved.

While a read-only laminate disc is described in the above embodiment, this embodiment can be applied to writable (WORM or erasable) laminate discs in which recording layers of a cyanine series organic pigment, a magneto-optical material or a phase-transfer material are formed instead of the recorded areas. Further, the first predetermined dose of ultraviolet light may be irradiated to the innermost circumferential portion of the radiation-curing adhesive layer 54 so as to impart tackiness to that portion.

As described above, according to the second embodiment of the present invention, irradiation is carried out until tackiness of the radiation-curing adhesive layers at least on the outermost circumferential portions disappears in the state where a pair of transparent base plates are bonded together by that radiation-curing adhesive layers, so that bond strength at the bonding edges where delamination is most likely to occur can be improved, giving an optical disc which enjoys reliability for an extended period.

The process for applying the coating material according to one embodiment of the present invention will be described specifically referring to FIGS. 6A and 6B and FIGS. 7A to 7D. Similar parts and portions to those in the prior art example are affixed with the same reference numbers, respectively.

Figure 6A:
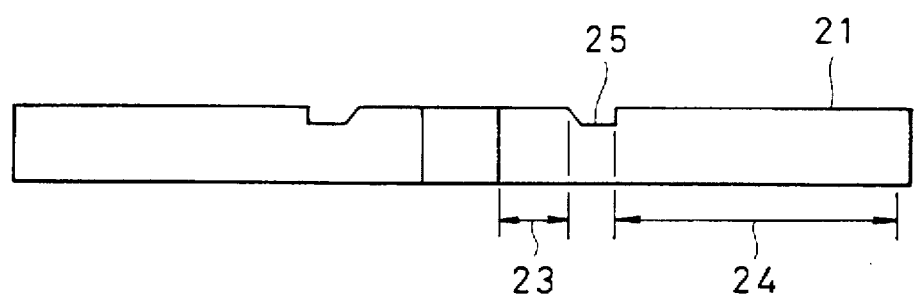
FIG. 6A is a vertical cross-sectional view of a base plate of an optical disc employed according to one embodiment of the coating process of the present invention.
Figure 6B:
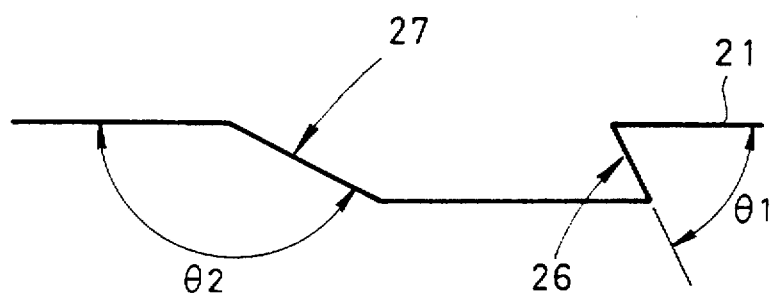
FIG. 6B is a partially enlarged view of FIG. 6A.

FIG. 6A shows a base plate of an optical disc employable according to the present invention; and FIG. 6B is an enlarged view of the annular recess formed on the base plate.

As shown in FIG. 6B, in the base plate 21 according to the embodiment of the present invention, the annular recess 25 is formed by employing a stamper holder, for holding a stamper along the inner circumference thereof in a molding die, the shape of which is changed such that the angle (θ1) to be formed between the outer wall surface 26 and the upper surface of the base plate 21 may be 90° or less, whereas the angle (θ2) to be formed between the inner wall surface 27 and the upper surface of the base plate 21 may be 100° or more. Incidentally, in FIG. 6B, the center of the base plate 21 is assumed to locate on the left side.

Figure 7A:
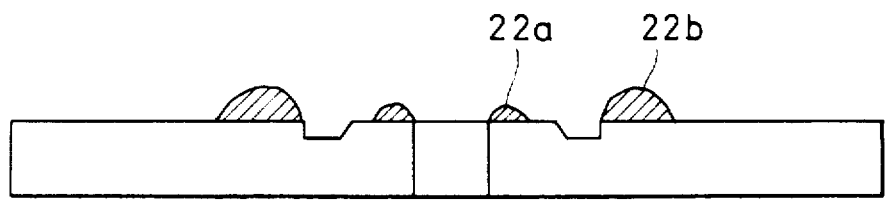
FIGS. 7A to 7D show, some of which in partially enlarged views, a process of coating the base plate shown in FIG. 6A with a coating material according to the embodiment of the present invention.

FIG. 7A shows a state where a coating material 22a is dropped annularly on the base plate 21 at the inner circumference of the inner non-recorded area 23 (first zone) locating inner than the annular recess 25, and a coating material 22b is dropped annularly along the inner circumference of the recorded area 24 (second zone) locating outer than the annular recess 25. The amount of the coating material 22a to be dropped to the inner non-recorded area 23 and that of the coating material 22b to be dropped to the recorded area 24 are controlled depending on the surface areas on which they are spread such that they may form films having the same thickness.

Figure 7B:
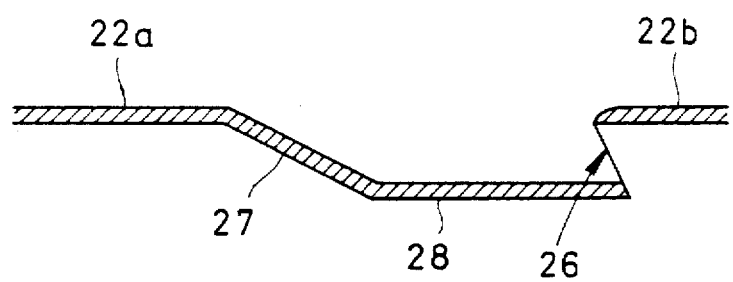
Figure 7C:
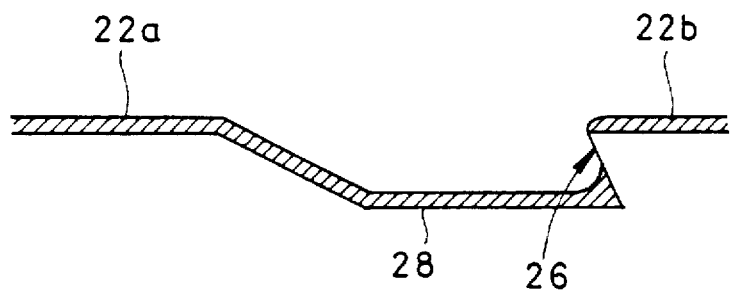

When the base plate 21 on which the coating materials 22a, 22b are dropped is rotated, the coating materials assuming liquid forms are spread little by little toward the periphery of the base plate 21 by the tackiness of the coating materials and by the centrifugal force, as shown in FIG. 7B.

Referring first to the coating material 22a, the coating material 22a dropped on the inner non-recorded area 23 is spread little by little by the centrifugal force outward to flow along a gently sloped inner wall surface 27 until it reaches a bottom 28 of the annular recess 25. Since the amount of this coating material 22a is properly adjusted beforehand depending on the surface area of the inner non-recorded area 23, the material 22a is distributed uniformly over the bottom surface of the annular recess 25 and ceases spreading any further, because the tackiness and the centrifugal force is well balanced, as shown in FIG. 7B. Meanwhile, if the amount of the coating material 22a dropped slightly exceeds the adequate level, the material 22a climbs a little the outer wall surface 26 but is rejected and stopped there by the wall surface 26. Such very small amount of coating material 22a climbing the outer wall surface 26 is hidden by the outer wall surface 26 protruding inward and can be hardly seen from the front side of the base plate 21, causing no deterioration in the surface quality of the base plate 21.

On the other hand, the coating material 22b dropped onto the recorded area 24 is likewise spread little by little outward by the tackiness of the coating material 22b and the centrifugal force to reach the peripheral edge, where the extra portion of the coating material 22b which failed to achieve balance between the tackiness and the centrifugal force is spun off from the base plate 21.

Figure 7D:
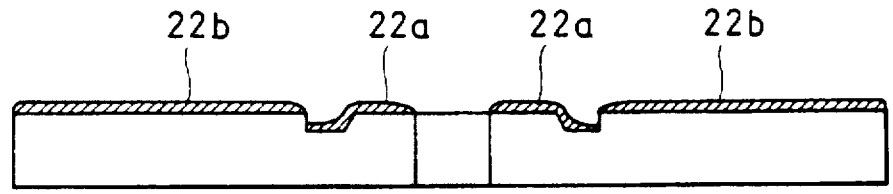

Since the coating material is dropped in suitable amounts annularly onto the inner non-recorded area and the recorded area of the base plate respectively and are adapted to be spread substantially uniformly over the entire surface of the base plate under rotation thereof, as shown in FIG. 7D, presence of the annular recess on the base plate gives no adverse effect such that air cells are included in the coating film to form a coating film having nonuniform thickness.

Further, if the coating material according to the present invention is employed as the resin for forming the protective film or as the adhesive for bonding the discs, it can achieve as the protective film-forming resin uniformalization of the total thickness of the optical disc obtained by bonding two discs together and improvement in the flatness thereof, and as the adhesive improvement in the strength of bonding the discs.

In the process of applying a coating material onto the base plate having an annular recess formed at a portion inner than the information recorded area according to the present invention, the coating material is dropped annularly along the inner circumference of the first zone locating inner than the annular recess formed on the base plate and along the inner circumference of the second zone locating outer than the annular recess, respectively, and then spread substantially uniformly over the entire surface of the base plate under rotation thereof. Accordingly, the presence of the annular recess on the base plate gives no adverse effect such that air cells are included in the coating material, enabling to provide a quality base plate having a coating film with uniform thickness formed over the entire surface.

Next, an optical disc according to a third embodiment of the present invention will be described referring to FIGS. 8A and 8B. The reference numbers 111 and 121 denote disc base plates made of a synthetic resin material, such as of polymethyl methacrylate (PMMA) and polycarbonate (PC), or glass, having a thickness of 0.2 to 0.8 mm, for example 0.6 mm. Each base plate has, on one surface excluding at least the innermost circumferential portion (inner non-recorded area), an information recorded area on which pits or grooves carrying information are formed. Reflecting films or recording films 112, 122 are formed on the information recorded areas excluding the innermost circumferential portions. The reflecting films 112, 122 are of Al or Al alloy thin films having a thickness of 500 to 1,500 Å, while the recorded films 112, 122 are formed using an organic pigment, a magneto-optical material, etc. The reflective films or recording films 112, 122 are covered respectively with protective films 113, 123 having a thickness of 5 to 20 μm formed by an ultraviolet-curing resin or a hot-melt type resin.

A sheet-like member 114 having adhesive layers 115 formed on each surface is interposed between the thus obtained pair of discs 110, 120 oriented such that their protective films 113, 123 may oppose each other, and the discs 110, 120 are bonded intimately together by the adhesive layers 115.

Incidentally, display portions 116 are formed on the sheet-like member 114 at the sites where they are opposed to the non-recorded areas of the base plates 110, 120, respectively. This sheet-like member 114 is an annular plate having substantially the same diameter as that of the base plates 111, 121 and a thickness of about 20 to 200 μm, and is made, for example, of a paper, a nonwoven fabric, a polyester film or an expanded polyurethane film. The adhesive layers 115 are formed by applying an acrylic or rubbery adhesive on each side of the sheet-like member 114 to a thickness of 10 to 20 μm.

Information on the recorded matters to be carried on the display portions 116 of the sheet-like member 114 by means of printing and the like include type of the optical disc such as laminate optical video disc, digital video disc and writable optical disc; identification of Side A or Side B; title of recorded information, etc. Further, in addition to such visual information, patterns which can be read optically or magnetically such as letters, symbols and bar codes carrying Side A/Side B identification, manufacturer, disc serial number, etc. can be provided on the display portions 116.

While protective films 113, 123 are formed on the reflecting films or recording films 112, 122 of the base plates 111, 121, respectively, in the embodiment shown in FIGS. 8A and 8B, it is also possible to omit the protective films and to bond the discs 110, 120 together with the reflecting films or recording films being opposed to each other as shown in FIG. 9. Meanwhile, the adhesive layers 115 are formed on each side of the sheet-like member 114, and the pair of base plates are bonded together thereby. However, the adhesive layers 115 may be formed directly on the reflecting films or recording films of the pair of base plate, and they may be bonded together with a sheet-like member being interposed therebetween.

As described above, according to the above embodiment, since the sheet-like member having display portions formed thereon is held intimately between a pair of disc base plates, and since the display portions are formed on the sheet-like member at the sites where they are opposed to the inner non-recorded areas of the light-transmitting base plates having no information-carrying pits or grooves, reflecting films, recording films, protective films, etc., the display portions can be seen and recognized through the inner non-recorded areas of the base plates, respectively, and further the display portions are prevented from being smudged or scratched. Further, the sheet-like member also serves as a reinforcing plate to prevent deformation of the disc effectively. In addition, the display portions are formed in a separate step which is not included in the line of producing discs, yield of discs can be prevented from lowering.

As has been described heretofore, in the optical disc according to the third or fourth embodiment of the present invention, since the display portions are formed on the sheet-like member interposed between a pair of base plates at the sites where they are opposed to the innermost non-recorded areas of the disc base plates respectively, quality display portions can be obtained, and besides deformation of the disc can be prevented.

What is claimed is:

1. A process for producing an optical disc, comprising:
   a step of preparing a pair of transparent base plates each having a recorded area containing pits or grooves formed on the major surface excluding the outermost and innermost circumferential portions;
   a step of forming a radiation-curing adhesive layer on the major surface of each transparent base plate;
   a step of irradiating a first predetermined dose of radiation to impart tackiness to said radiation-curing adhesive layer at least at the portion present on said recorded area;
   a step of bonding the thus treated pair of transparent base plates together by said radiation-curing adhesive layers; and
   a step of irradiating a second predetermined dose of radiation, which is greater than said first predetermined dose, onto said radiation-curing adhesive layer at the outermost circumferential portions to firmly fix the base plates together.

2. The process according to claim 1, wherein said transparent base plates are disc-shaped base plates having a thickness of 0.2 to 0.8 mm.

3. A process for producing an optical disc, comprising:
   a step of preparing a pair of transparent base plates each having a recorded area containing pits or grooves formed on the major surface excluding the outermost and innermost circumferential portions;
   a step of forming a radiation-curing adhesive layer on the major surface of each transparent base plate;
   a step of irradiating a first predetermined dose of radiation to impart tackiness to said radiation-curing adhesive layer at least at the portion present on said recorded area;
   a step of bonding the thus treated pair of transparent base plates together by said radiation-curing adhesive layers; and
   a step of irradiating a second predetermined dose of radiation, which is greater than said first predetermined dose, onto said radiation-curing adhesive layer at the outermost circumferential portions and the innermost circumferential portions only to firmly fix the base plates together.

4. The process according to claim 3, wherein said transparent base plates are disc-shaped base plates having a thickness of 0.2 to 0.8 mm.

* * * * *